US007880900B2

(12) United States Patent
Tharion et al.

(10) Patent No.: US 7,880,900 B2
(45) Date of Patent: Feb. 1, 2011

(54) MEASURING APPARATUS FOR PERFORMING POSITIONAL ANALYSIS ON AN INTEGRATED CIRCUIT CARRIER

(75) Inventors: Joseph Tharion, Balmain (AU); William Granger, Balmain (AU); Ralph Lewis Ranger, Balmain (AU); Graeme Kenneth Bowyer, Balmain (AU); Jason Mark Thelander, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 237 days.

(21) Appl. No.: 12/193,718

(22) Filed: Aug. 19, 2008

(65) Prior Publication Data

US 2010/0046007 A1 Feb. 25, 2010

(51) Int. Cl.
*G01B 11/14* (2006.01)

(52) U.S. Cl. .................................................... 356/614

(58) Field of Classification Search .......... 356/600-640
See application file for complete search history.

(56) References Cited

U.S. PATENT DOCUMENTS

| | | | | |
|---|---|---|---|---|
| 4,238,780 | A * | 12/1980 | Doemens | 382/151 |
| 4,307,455 | A | 12/1981 | Juhasz et al. | |
| 4,724,429 | A | 2/1988 | Millen et al. | |
| 4,745,295 | A * | 5/1988 | Seno et al. | 250/559.26 |
| 4,799,175 | A * | 1/1989 | Sano et al. | 382/151 |
| 4,978,224 | A * | 12/1990 | Kishimoto et al. | 356/394 |
| 5,177,469 | A | 1/1993 | Igarashi et al. | |
| 5,307,154 | A * | 4/1994 | Naemura et al. | 356/400 |
| 5,691,544 | A * | 11/1997 | Stern et al. | 250/559.29 |
| 5,715,168 | A | 2/1998 | Ito | |
| 5,822,449 | A * | 10/1998 | Kobayashi et al. | 382/141 |
| 5,864,943 | A * | 2/1999 | Arakawa et al. | 29/740 |
| 5,889,259 | A * | 3/1999 | Krasznai et al. | 219/414 |
| 6,091,498 | A * | 7/2000 | Hanson et al. | 356/623 |
| 6,553,270 | B1 | 4/2003 | Houle et al. | |
| 6,655,019 | B2 * | 12/2003 | Wuyts | 29/837 |
| 6,710,798 | B1 * | 3/2004 | Hershel et al. | 348/87 |
| 6,778,079 | B2 | 8/2004 | Weber | |
| 6,870,611 | B2 * | 3/2005 | Savareigo et al. | 356/237.5 |
| 2002/0017599 | A1 | 2/2002 | Shimizu | |
| 2006/0243710 | A1 | 11/2006 | Azuma et al. | |

FOREIGN PATENT DOCUMENTS

| | | |
|---|---|---|
| EP | 1178291 | 1/1970 |

* cited by examiner

*Primary Examiner*—Gregory J Toatley
*Assistant Examiner*—Jarreas C Underwood

(57) ABSTRACT

The invention relates to a measuring apparatus. The apparatus includes a housing assembly that defines an enclosure, a control system mounted in the housing assembly, and an operator interface mounted on the housing assembly and connected to the control system to allow an operator to control the measuring apparatus. The apparatus also includes a measuring table assembly mounted in the housing assembly and configured to receive a nest assembly supporting an integrated circuit carrier carrying a number of integrated circuits, and a camera assembly mounted in the housing assembly and configured to generate image data representing the integrated circuit carrier and the integrated circuits. The camera assembly is connected to the control system which is configured to carry out a positional analysis on the integrated circuit carrier and the integrated circuits to determine at least one of positions of the integrated circuits on the carrier and relative positions of consecutive integrated circuits.

6 Claims, 13 Drawing Sheets

MEASURING APPARATUS FOR PERFORMING POSITIONAL ANALYSIS ON AN INTEGRATED CIRCUIT CARRIER

FIELD OF INVENTION

The invention relates to the field of printing, in general. More specifically, the invention relates to testing of alignment printhead integrated circuits positioned on a carrier.

BACKGROUND

Pagewidth printers that incorporate micro-electromechanical components generally have printhead integrated circuits that include a silicon substrate with a large number of densely arranged, micro-electromechanical nozzle arrangements. Each nozzle arrangement is responsible for ejecting a stream of ink drops.

In order for such printers to print accurately and maintain quality, it is important that the printhead integrated circuits be tested. This is particularly important during the design and development of such integrated circuits.

Some form of platform or carrier is generally required for testing such integrated circuits. The carrier is required to be suitable for the attachment of printhead integrated circuits. In addition, in order for an array of printhead integrated circuits on the carrier to operate properly, relative orientation of the printhead integrated circuits should be monitored.

SUMMARY

According to a first aspect of the invention there is provided a measuring apparatus for measuring the positions of a plurality of printhead integrated circuits relative to a carrier on which the printhead integrated circuits are located, the carrier having carrier fiducials and each integrated circuit having integrated circuit fiducials, said measuring apparatus comprising:

a support assembly;

a receptacle positioned on the support assembly and configured to receive the carrier, the receptacle being movable relative to the support assembly between a loading position and a sensing position;

a sensor configured to sense positions of the carrier and integrated circuit fiducials; and a control system configured to control the sensor to measure the positions of the carrier and integrated circuit fiducials.

Preferably, the support assembly includes a displacement mechanism to displace the receptacle between the loading and sensing positions.

Preferably, the receptacle includes a clamp arrangement for clamping the carrier to the receptacle.

Preferably, the sensor includes a digital camera arrangement configured to sense the fiducials and to communicate image data representing the fiducials to the control system.

Preferably, the control system includes a graphical display for displaying the image data.

Preferably, the control system is configured further to process the image data to measure positions of the carrier fiducials and the integrated circuit fiducials and to generate positional data for analysis.

Preferably, the control system includes a reader configured to read a code on the carrier.

Preferably, the reader includes a barcode scanner for reading a barcode on the carrier.

According to a second aspect of the invention there is provided a method for testing an alignment of a carrier with respect to a plurality of integrated circuits on the carrier, the carrier having optically discernible carrier references and each integrated circuit having optically discernible circuit references, said method comprising the steps of:

receiving the carrier in a holding assembly;

sensing positions of the carrier and circuit references; and measuring the positions of the carrier and circuit references.

Preferably, the step of receiving the carrier in the holding assembly includes the step of clamping the carrier between clamps of the holding assembly.

Preferably, the step of sensing includes the step of sensing two of the carrier references and two of the circuit references on each integrated circuit.

Preferably, the step of sensing includes sensing with a digital camera arrangement and generating image data.

Preferably, the step of measuring includes the step of generating and displaying an image from the image data.

Preferably, the step of measuring includes the step of generating co-ordinate values corresponding to positions of the carrier references and the circuit references.

Preferably, the step of measuring includes the step of measuring an alignment of consecutive integrated circuits using the co-ordinate values.

According to a third aspect of the invention there is provided a safety system for a measuring apparatus for measuring positions of integrated circuits on an integrated circuit carrier positioned, in use, in a working enclosure of the machine, said safety system comprising:

a sensor arrangement for sensing an operational status of the measuring apparatus;

an emergency cut-off configured to deactivate the measuring apparatus automatically when an undesired operational status is sensed by the sensor arrangement; and a control system connected to the sensor arrangement and the emergency cut-off to activate the emergency cut-off on receipt of a predetermined signal from the sensor arrangement.

Preferably, the operational status is an aspect selected from: a position of at least one measuring device of the measuring apparatus; a presence of a foreign object in the working enclosure; a fluid pressure of a pneumatic or hydraulic mechanism of the measuring apparatus; a position of the integrated circuit carrier; authenticity of the carrier; an electricity supply to the measuring apparatus; and an operator identifier of an operator operating the measuring apparatus.

Preferably, the sensor arrangement has a plurality of microswitches for sensing the position of the at least one movable mechanism.

Preferably, the sensor arrangement includes a light curtain to sense the ingress of a foreign object into the enclosure.

Preferably, the sensor arrangement includes a pressure sensor to sense the fluid pressure of a hydraulic or pneumatic movable mechanism.

The sensor arrangement may include proximity switches to determine the position of the integrated circuit carrier.

The sensor arrangement may include a barcode scanner to scan a barcode of the integrated circuit carrier.

The sensor arrangement may include a residual current circuit breaker to detect residual current and provide overcurrent protection.

According to a fourth aspect of the invention there is provided a measuring apparatus comprising:

a housing assembly that defines an enclosure;

a control system mounted in the housing assembly;

an operator interface mounted on the housing assembly and connected to the control system to allow an operator to control the measuring apparatus;

a measuring table assembly mounted in the housing assembly and configured to receive a nest assembly supporting an integrated circuit carrier carrying a number of integrated circuits; and a camera assembly mounted in the housing assembly and configured to generate image data representing the integrated circuit carrier and the integrated circuits, the camera assembly being connected to the control system which is configured to carry out a positional analysis on the integrated circuit carrier and the integrated circuits to determine at least one of positions of the integrated circuits on the carrier and relative positions of consecutive integrated circuits.

The housing assembly may include a closure which can be opened or closed to allow or prevent access to the enclosure. The closure may include a safety switch and the control system may include a controller connected to the safety switch to stop operation of the measuring apparatus if the closure is opened during operation.

The measuring table assembly may include a linear stage assembly to displace the nest assembly linearly into an imaging position.

The camera assembly may include a camera post that is mounted on the measuring bed assembly to extend operatively above the measuring bed assembly.

The camera assembly may include a digital camera mounted on the camera post to be displaceable with respect to the camera post for focusing purposes. The digital camera may be connected to the control system so that the control system can receive the image data generated by the digital camera.

The control system may be configured to identify fiducials on the integrated circuit carrier and the integrated circuits and to calculate co-ordinate values with respect to a predetermined reference point corresponding to said fiducials.

The control system may be configured to determine positions of the integrated circuits on the integrated circuit carrier and relative positions of the integrated circuits to assess alignment of the integrated circuits.

According to a fifth aspect of the invention there is provided an imaging apparatus for imaging integrated circuits and a respective integrated circuit carrier so that positional analysis can be carried out on the integrated circuits and respective carrier, the imaging apparatus comprising a support structure;

a bed mounted on the support structure and displaceable along an operatively horizontal axis, the bed being configured to support a nest assembly that operatively retains the integrated circuit carrier and respective integrated circuits;

a support assembly operatively mountable with respect to a bed on which the integrated circuit carrier and integrated circuits are supported, in use; and an image recordal device mounted on the support assembly and configured to record an image representing the integrated circuit carrier and integrated circuits, the support assembly including an adjustment mechanism to enable adjustment of a position of the image recordal device relative to the bed.

The bed may include a linear stage engaged with the support structure to facilitate adjustment of a position of the bed relative to the support structure along the horizontal axis.

The bed may include a proximity sensor to generate a suitable signal when the nest assembly is in a predetermined position.

The support assembly may include a support post extending operatively vertically with respect to the bed, the adjustment mechanism being in the form of a linear displacement mechanism mounted on the support post to displace the image recordal device with respect to the support post.

The image recordal device includes LED assemblies incorporating LED's and positioned on the support assembly such that the LED's illuminate the integrated circuit carrier and the integrated circuits.

The image recordal device includes a digital camera, the adjustment mechanism being configured to adjust the position of the digital camera to achieve focus of the digital camera.

The digital camera is a black and white camera incorporating a CCD array.

The image recordal device includes a lighting controller to control operation of the LED's.

According to a sixth aspect of the invention there is provided a software product for execution by a controller of a measuring apparatus, as described above, said software product enabling the apparatus to perform the above method.

According to a seventh aspect of the invention there is provided a computer readable medium incorporating a software product, as described above.

Embodiments of the invention are now described, by way of example, with reference to the accompanying drawings. The following description is intended to illustrate particular embodiments of the invention and to permit a person skilled in the art to put those embodiments of the invention into effect. Accordingly, the following description is not intended to limit the scope of the preceding paragraphs in any way.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

Aspects of the invention will now be described with reference to specific embodiments thereof. Reference to "an embodiment" or "one embodiment" is made in an inclusive rather than restrictive sense. As such, reference to particular features found in one embodiment does not exclude those features from other embodiments.

The following description is intended to assist a person skilled in the art to understand the invention. Accordingly, features commonplace in the art are not described in particular detail, as such features will be readily understood by the skilled person.

Figure 1:
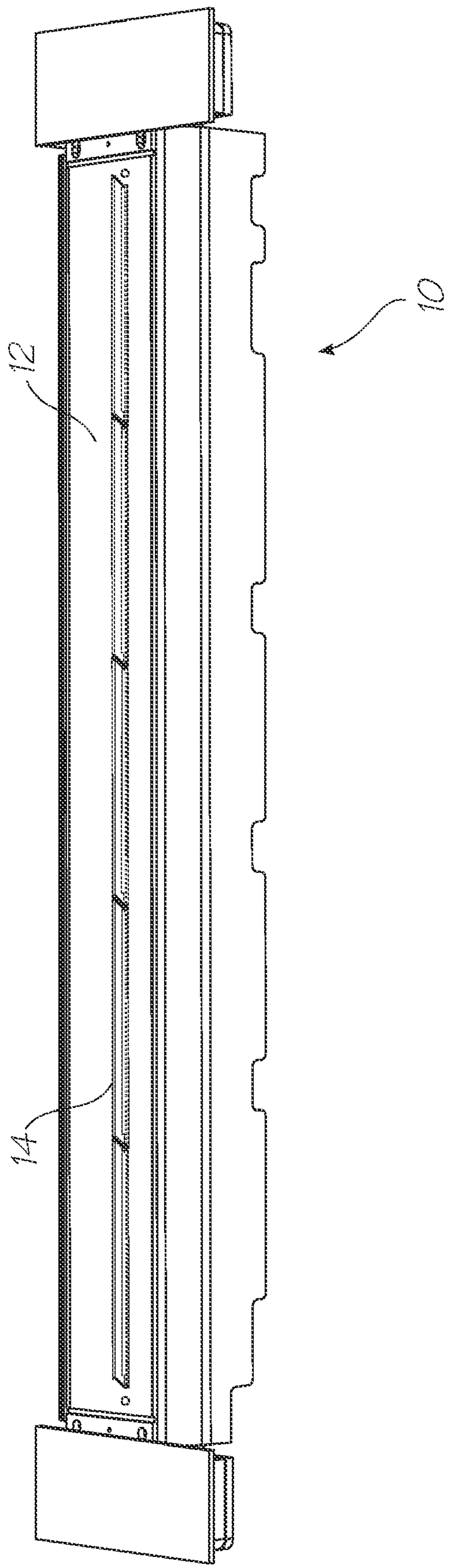
FIG. 1 shows a front perspective view of a carrier for printhead integrated circuits.

With reference to FIG. 1 of the drawings, a carrier 10 for a number of printhead integrated circuits (ICs) 14 is shown. The carrier 10 is an LCP (liquid crystal polymer) molding which has a co-efficient of thermal expansion very near that of silicon. As the printhead heats to its operational temperature, any difference in the thermal expansion of the printhead ICs and the carrier will be within acceptable tolerances. The printhead ICs 14 include an array of nozzle arrangements configured to eject ink drops onto a printing medium. The nozzle arrangements are MEMS (micro-electromechanical system) devices fabricated using lithographic etching and deposition processes commonly employed in semi-conductor chip production.

The carrier 10 defines a number of tortuous ink paths therein (not shown) which terminate in a surface on which the printhead ICs 14 are mounted. The printhead ICs 14 are mounted to the carrier 10 via an adhesive laminar film 12 (often referred to as a die attach film) with suitable perforations or openings positioned to establish fluid communication between each of the ink paths and corresponding nozzles rows on the printhead ICs. The ink paths in the carrier 10 facilitate the delivery of ink from a suitable ink reservoir to the printhead ICs 14. The printhead ICs 14 must be aligned when mounted to the carrier 10. Misalignment of the printhead ICs 14 on the carrier 10 can lead to bad print quality or inlets of the printhead ICs 14 being out of register with the openings in the adhesive laminar film 12.

Figure 2:
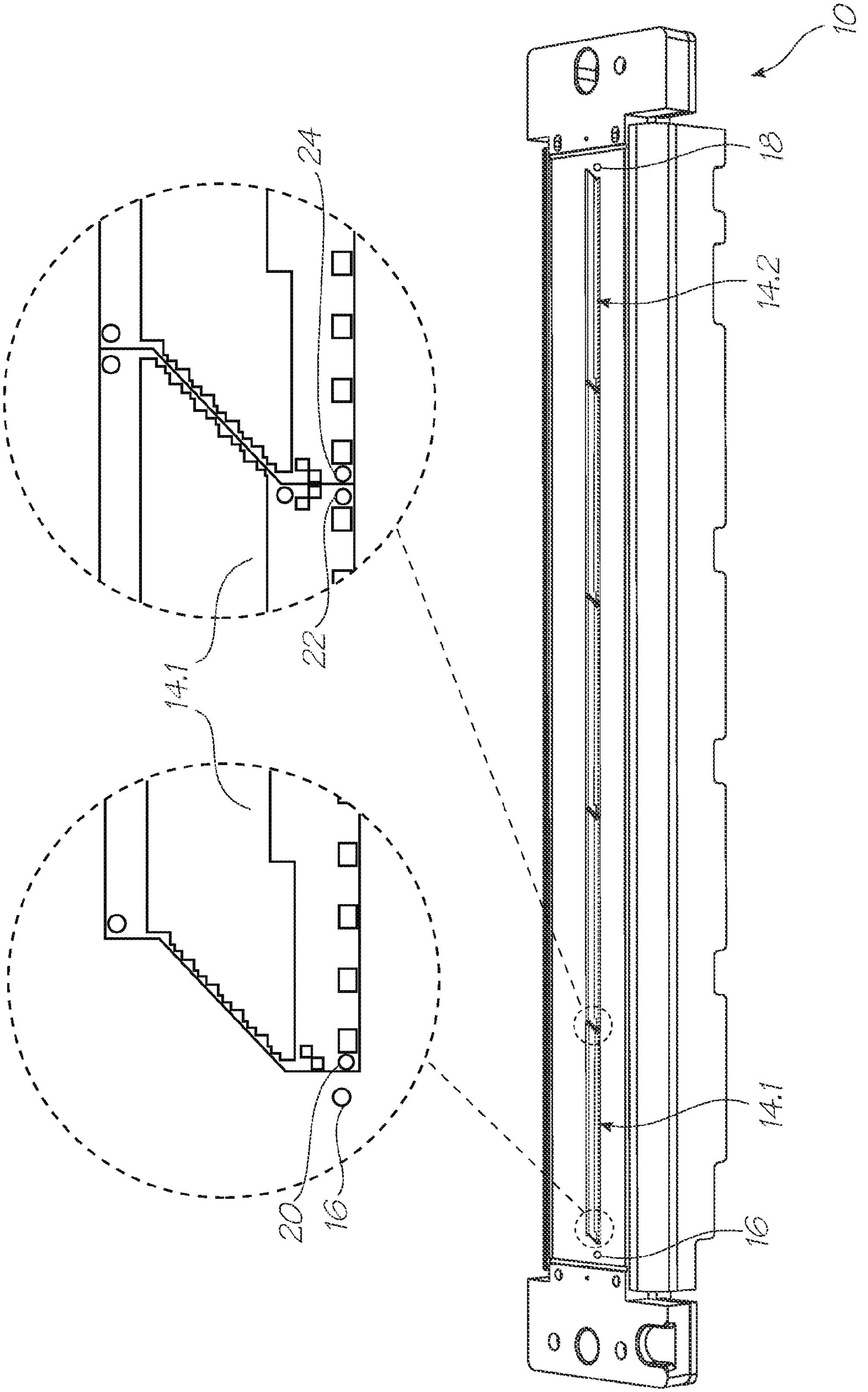
FIG. 2 shows a top view of the carrier of FIG. 1 showing alignment of fiducials, in accordance with one embodiment of the invention.

FIG. 2 shows a closer view of the surface of the carrier 10 on which the printhead ICs 14 are mounted. The carrier 10 includes a first carrier fiducial 16 and a second carrier fiducial 18. The carrier fiducials 16 and 18 are accurately located on the carrier 10 during manufacture thereof. These fiducials serve as points of reference for aligning the printhead ICs 14 on the carrier 10.

The printhead ICs 14 have two fiducials each. The enlarged insets of FIG. 2 shows printhead IC 14.1 has first fiducial 20 located on one end thereof and a second fiducial 22 located on an opposite end. The IC mounted adjacent IC 14.1 has similar fiducials located on its ends, such that its first fiducial 24 is closely adjacent the second fiducial 24 on IC 14.1. The IC fiducials e.g. 20, 22 are preferably less than 150 μm in diameter and typically less than 100 μm in diameter. The fiducials 20 and 22 are 95 μm dia. bare aluminum etched during manufacture of each printhead IC 14. In the embodiment shown, there are five printhead ICs 14 mounted on the carrier 10, the last IC being indicated by reference numeral 14.2. The first and last ICs 14.1 and 14.2 are mounted so that their respective fiducials lie within a predetermined tolerance to the carrier fiducials 16 and 18 respectively.

The intermediate printhead ICs 14 are then laid end-to-end between end printhead ICs 14.1 and 14.2 so that their respective fiducials align to within a predetermined tolerance with respect to each other. By measuring the positions of the different fiducials with respect to one another, it is possible to measure the alignment of the printhead ICs with each other and with respect to the carrier 10.

Figure 3:
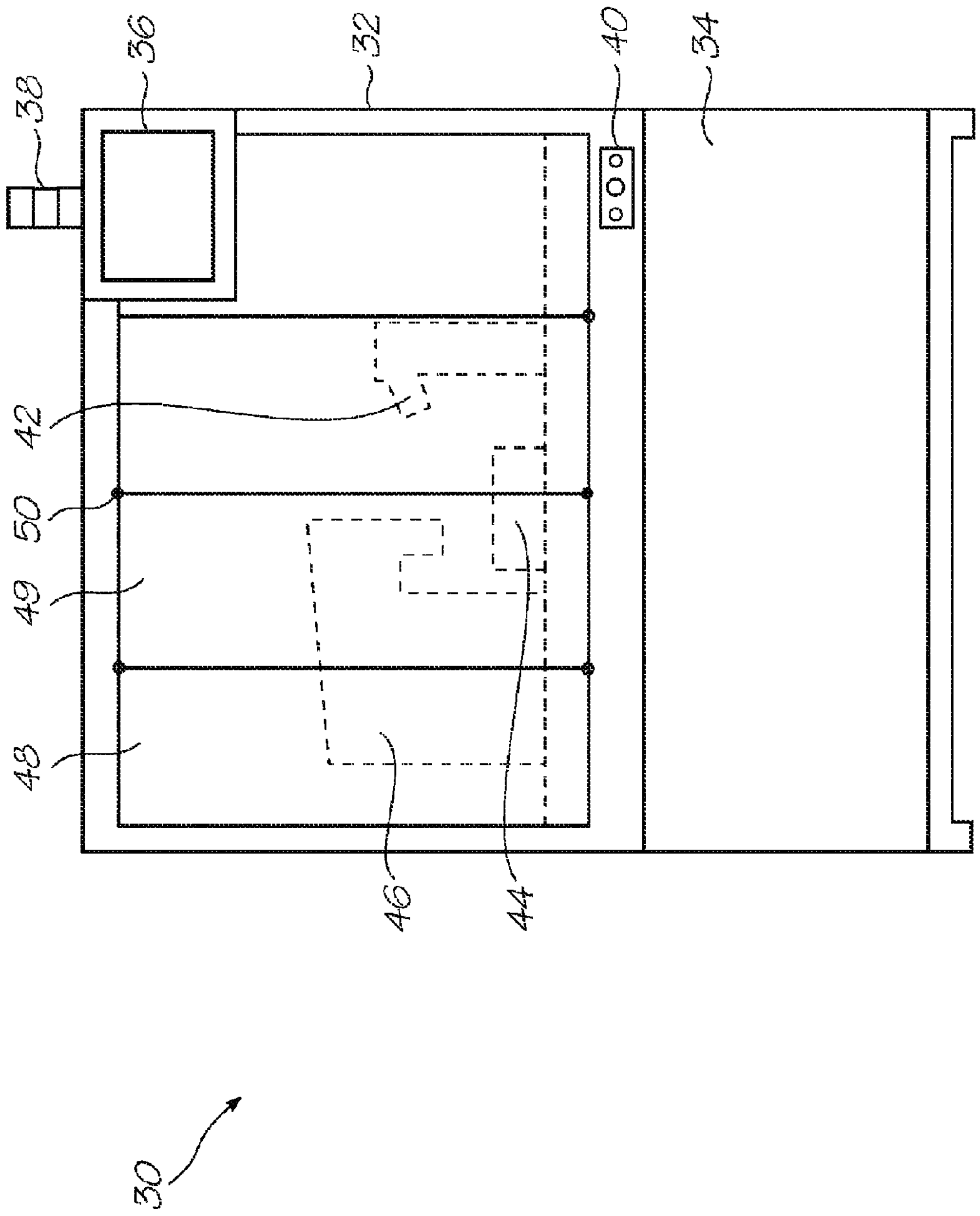
FIG. 3 shows a schematic front view of a measuring apparatus for measuring alignment of fiducials, in accordance with one embodiment of the invention.

FIG. 3 shows an embodiment of a measuring apparatus 30 for measuring the positions of the fiducials 16, 18 of the carrier 10 and the fiducials 20 and 22 of the printhead ICs 14 shown in FIG. 2. In broad terms, the apparatus 30 is configured to sense the fiducials, compare the distances between the respective fiducials to a predetermined tolerance, and display these results. The apparatus 30 is also typically configured to relay the results to a remote monitoring system that manages a manufacturing process of printing equipment. More detail of the remote monitoring system is discussed below.

In the embodiment shown, the apparatus 30 includes a support structure or housing 32 having a services panel 34. The housing 32 houses a support assembly 44, a camera assembly 46 and a barcode scanner 42 (also represented in FIG. 10) behind transparent panels 48. The panels 48 also form a sliding door 49 to allow an operator access to the support assembly 44. The door 49 includes a magnetic door switch 50 which forms part of a safety system of the apparatus, as described below. Also shown is a warning beacon 38, which indicates an operational status of the apparatus 30, a touch panel PC 36 and control panel 40 which allows operator interface with the apparatus 30.

The door 49 also provides a practical safety feature of covering the touch panel PC 36 and control panel 40 when in an open position, as the panel 48 slides over these components to provide access to the components inside the housing 32. When the panel 48 is open to allow access to the inside of the housing 32, access to the touch panel PC 36 and control panel 40 is effectively restricted. This prevents accidentally activating the apparatus 30 when the panel 48 of the housing 32 is open, which may injure the operator of the apparatus.

Figure 4:
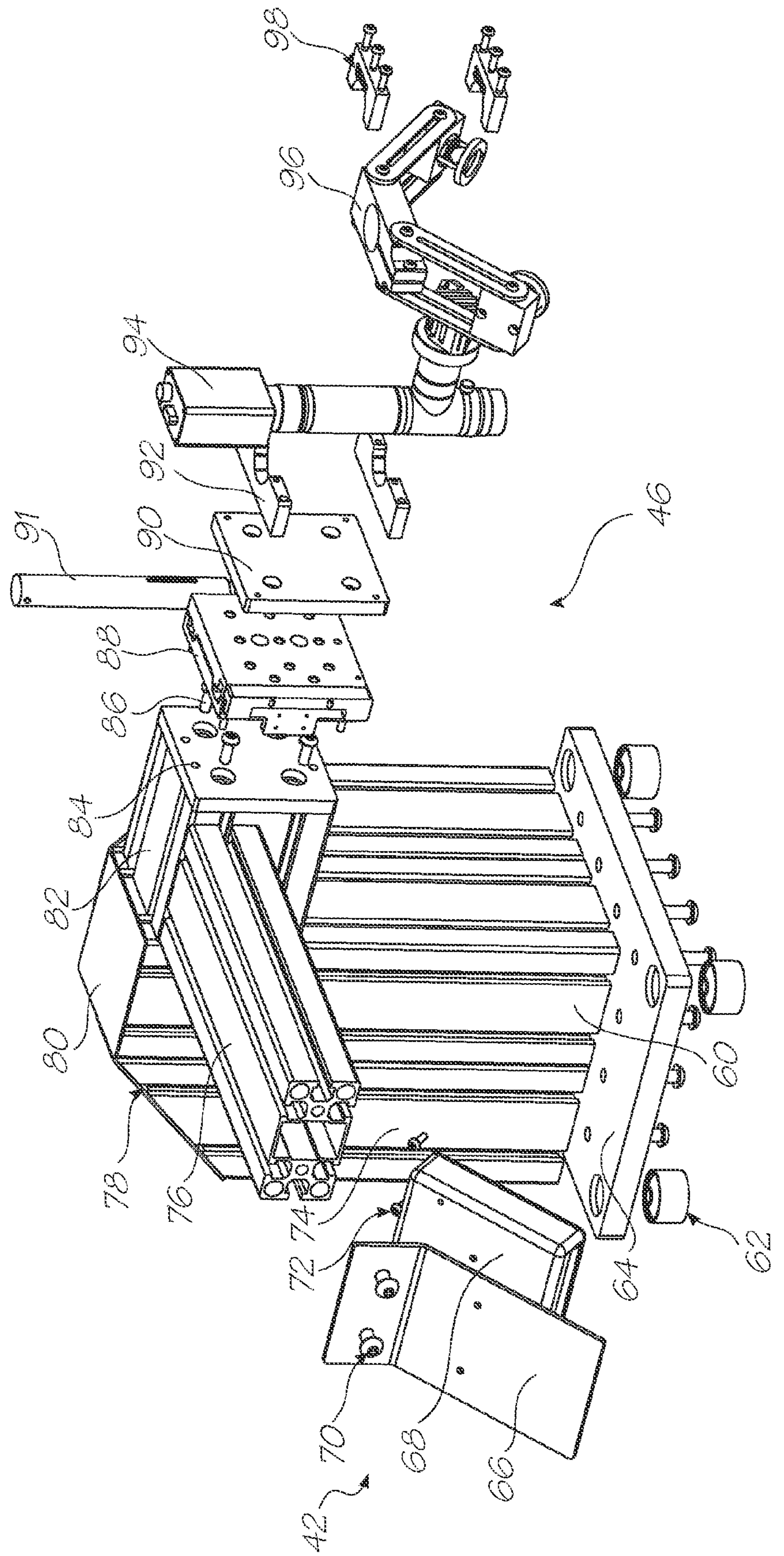
FIG. 4 shows a front perspective exploded view of components forming a camera assembly, in accordance with one embodiment of the invention, of the apparatus of FIG. 3.

FIG. 4 shows the components forming one embodiment of the camera assembly 46 and barcode scanner 42 in more detail. The camera assembly 46 includes a camera mount base 64 with rubber mountings 62 for mounting to the housing 32. Also included is camera post 74 fitted to the mount base 64, having an upright pillar 60 and a cover plate 80 with a cover 78 to form a structure for supporting a pedestal 82 to which positioning beam 76 is attached, as shown.

The beam 76 serves as support for the barcode scanner 42, that has a sensor 68 attached to a bracket 66, as shown. The Hand Held Products Inc. IT3800 model barcode scanning sensor is suitable for this application. The sensor 68 is attached to the bracket 66 with mounting screws 76, with the bracket 66 in turn fixed to the beam 76 by means of socket screws 70.

Camera and optics, forming an optical assembly 94, are attached to the supporting pedestal 82 with a camera bracket 98 and a camera mounting base 92 operatively fast with a mounting plate 90, as shown. Also included is camera lighting module 96. The Allied Vision AVT F-145B black and white IEEE 1394 SXGA+C-Mount digital camera equipped with a Megapixel Sony ⅔" type progressive CCD-array is suitable for this application. The lighting module includes LEDs (light emitting diodes) coupled with a Gardasoft PP610 lighting controller 146 (see FIGS. 8 and 10). The camera is assembled with adapters and tubes, as shown, to complete the optical assembly 94. The optical assembly 94 is arranged in signal communication with a controller of the apparatus to allow the controller to "see" the fiducials.

The mounting plate 90 is attached to the pedestal 82 by means of a camera adapter plate 84 operatively fast with a mounting member 88 via socket fasteners 86, as shown. The mounting plate 90 includes a linear stepper motor 91 to facilitate focusing the camera by moving the camera in a Z-axis direction. Stepper motor 91 is controlled by a stepper motor controller 250 shown in FIG. 11.

Referring again to FIG. 11, the controller 250 communicates with the optical assembly 94 via the contacts 252. The controller 250 is configured to generate motor drive signals at contacts 254 and to receive positional feedback at contacts 256. The motor 91 includes an integral Hall effect limit switch 258 for positional adjustment of the motor 91.

Figure 5:
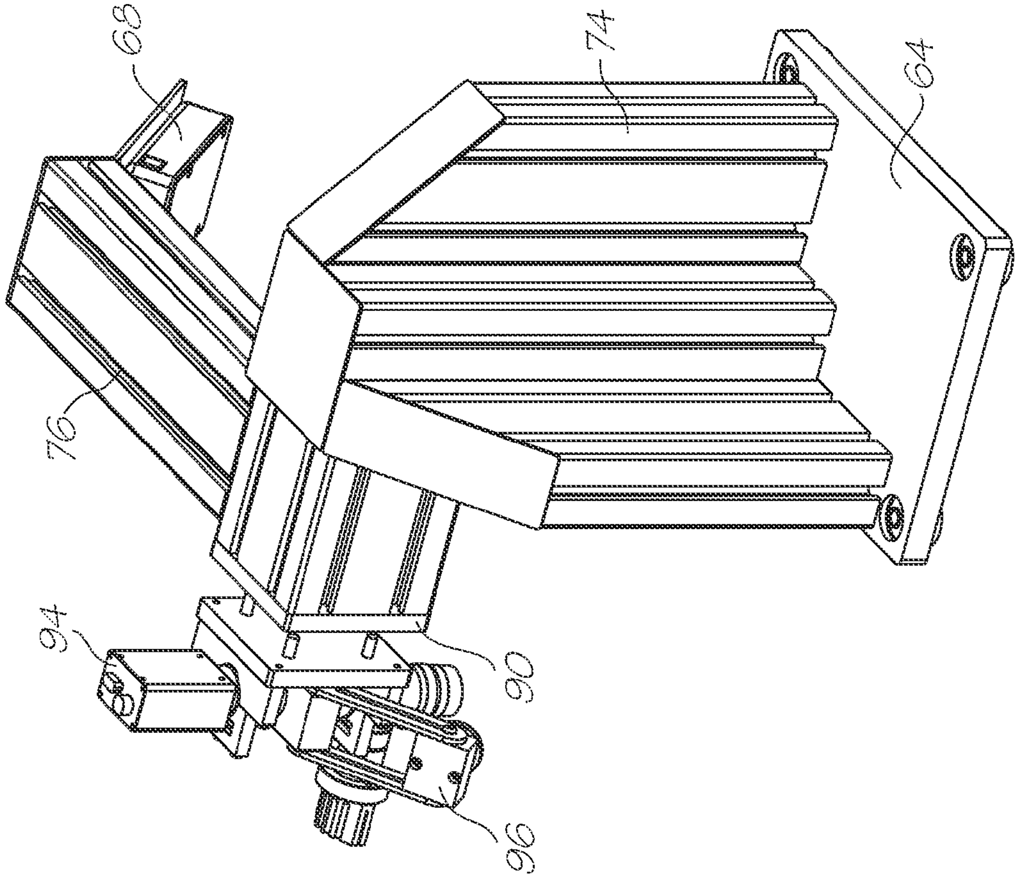
FIG. 5 shows a rear perspective of the camera assembly of FIG. 4.

FIG. 5 shows a rear perspective view of the camera assembly 46 of FIG. 4, with the components assembled.

Figure 6:
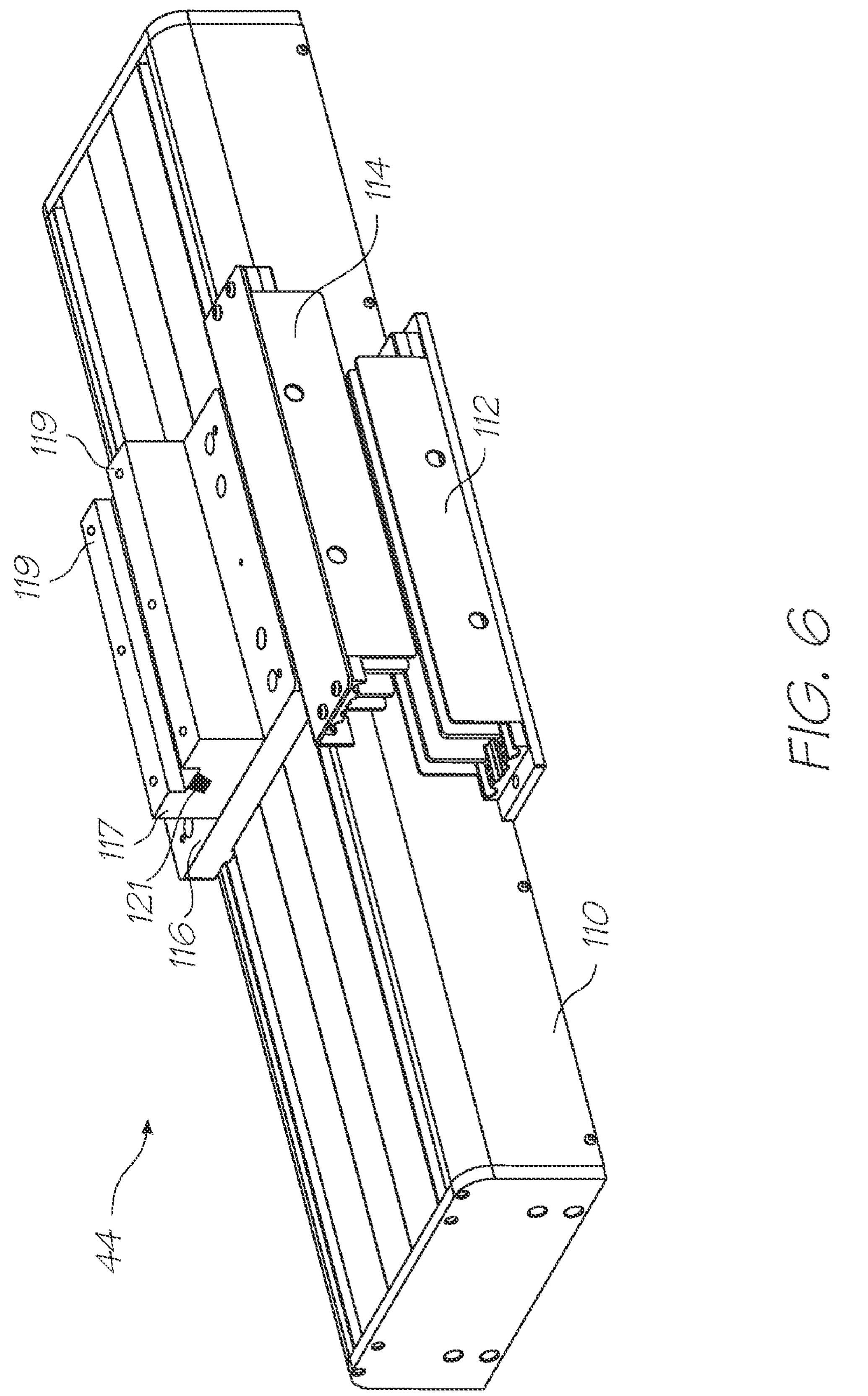
FIG. 6 shows a front perspective view of a support assembly, in accordance with one embodiment of the invention, of the apparatus of FIG. 3.

FIG. 6 shows the support assembly or measuring table assembly 44 in more detail. The support assembly 44 includes a displacement mechanism in the form of linear servo motor 110, and plate adapter 116 for mounting a carrier clamp or carrier receptacle 117 thereto. The receptacle 117 is shaped and dimensioned to receive the carrier 10 shown in FIG. 2, in use, and includes two pneumatic clamps 119 to hold the carrier in place. When the operator places the carrier 10 in the receptacle fast with the plate adapter 116, the controller clamps the carrier fast in the receptacle 117, when the measuring process is actuated to ensure accuracy of fiducial detection. Operation of the clamps 119 is described with reference to FIG. 10 below. The servo motor 110 (FIG. 12) is controlled with a servo motor controller 152 that is described in further detail below.

Figure 10:
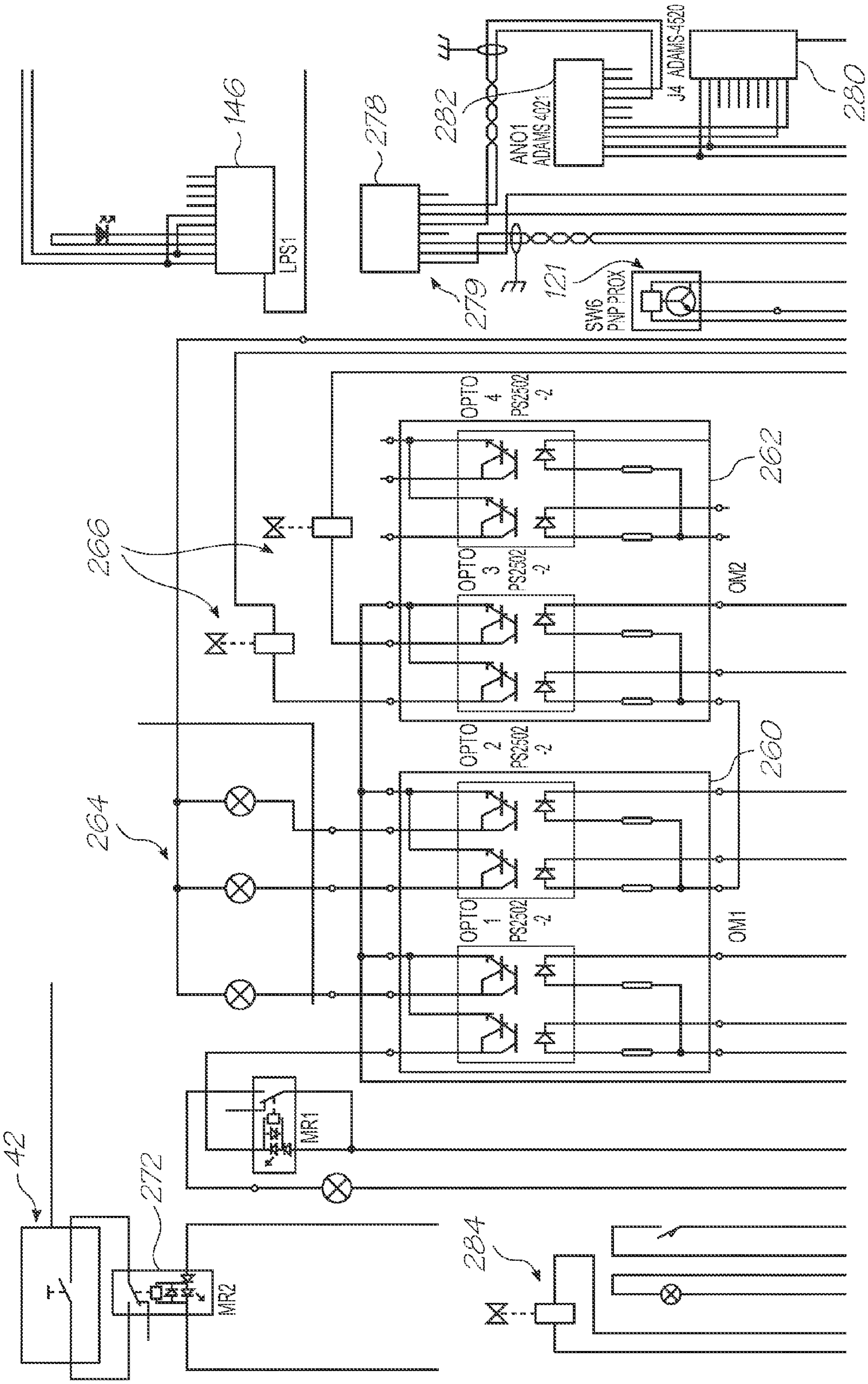
FIG. 10 shows a diagram of a number of mechanical and electrical components of the apparatus of FIG. 3.

As can be seen in FIG. 10, the apparatus includes four optocouplers, two indicated at 260 to switch red, amber and green lights 264 on and off and two indicated at 262 to operate the pneumatic clamps 119 with solenoid valves 266 (FIG. 10). LEDs of the optocouplers 260 are connected to the stepper motor controller 250 (see FIG. 11) and to the servo motor controller 152. The receivers of the optocouplers 260 are, in turn, connected to the red, amber and green lights 264 so that the lights 264 can indicate an operational status of the stepper and servo motors 91, 110.

The servo motor controller 152 (FIG. 12) is connected at 276 to a pneumatic clamp arrangement 274 shown in FIG. 10. In particular, the controller 152 is connected to a pressure regulator 278 of the clamp arrangement 274, at 279. Controlling software defined by the PC associated with the touch panel 36 (see FIG. 3) can also communicate with the pressure regulator 278 via a signal converter 280 and an analogue output module 282. Thus, operation of the pneumatic clamps 119 (see FIG. 6) is coordinated with operation of the servo motor 110 and the camera assembly 46 (see FIGS. 4 and 5).

Also shown in FIG. 10 is a manual isolation valve 284 having the pneumatic structure indicated with reference numeral 202 in FIG. 9, and described in further detail below.

The servo motor controller 152 controls the servo motor 110 so that the plate adapter 116 can be moved between a loading position, where an operator is able to load the carrier 10 into the clamp, and a sensing position, where the receptacle with carrier 10 is below the optical assembly 94.

The PBA LMS50 linear stage motor is a suitable servo motor 110. The receptacle 117 also typically includes a proximity switch 121 (indicated physically in FIG. 6 and in the control diagram of FIG. 10). The proximity switch 121 is connected to the controller 152 at 286 (FIG. 11) so that the controller 152 can stop the motor 110 once the plate 116 has reached a predetermined extent of movement.

The Pepperl and Fuchs NBB1,5-F79-E2 inductive proximity switches are suitable for this role. The support assembly 44 also includes cable trays 112 and 114 for housing and locating electrical wires to the linear motor 110 and pneumatic lines to the clamp in a manner which allows unobstructed movement of the plate 116 relative to the motor 110.

Figure 7:
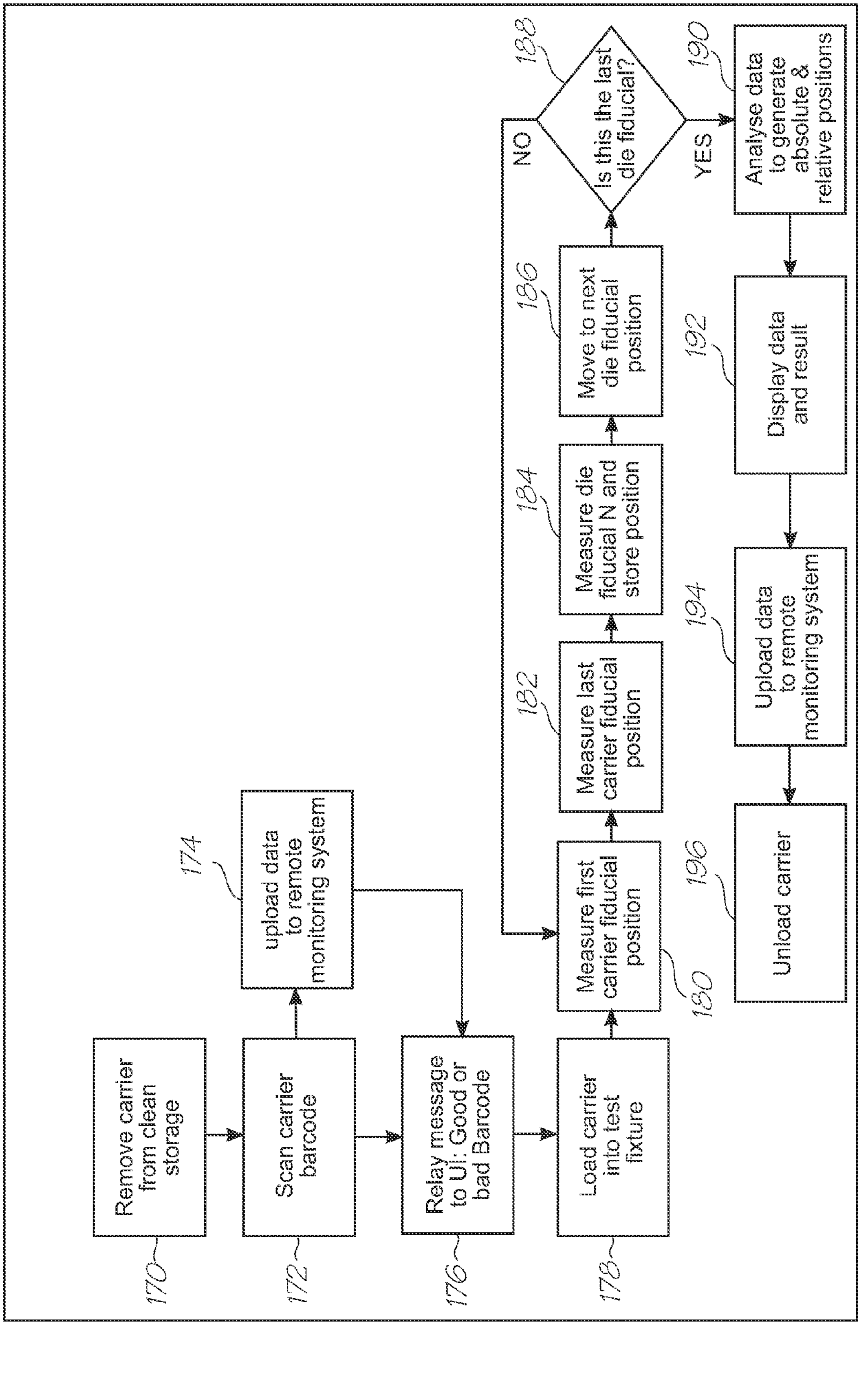
FIG. 7 shows a block diagram for a method of testing alignment of a carrier with respect to a number of integrated circuits, in accordance with one embodiment of the invention.

FIG. 7 shows a block diagram of method steps performed by an operator and the apparatus 30 to check alignment of the fiducials. It is to be appreciated that reference to a reference numeral representing a particular method step refers to a respective block indicated by such reference numeral in the accompanying drawings. As such, the method included in the invention is not limited or constrained to particular method steps referred to in this manner. A skilled person will understand that further methods are possible under this invention which might exclude some of these steps or include additional steps.

The apparatus 30 includes a control system or controller, discussed below, which provides a safety system and control during operation. The control system uses the touch panel PC 36 as an operator interface. Accordingly, some steps of the method are performed by the control system, whilst some steps are performed by an operator, as will be apparent from the below discussion.

A remote monitoring system is referred to in the steps of FIG. 7. The remote monitoring system is typically a separate computer system arranged in signal communication with the apparatus 30, and more specifically with a network interface of the apparatus 30, as described below. The remote monitoring system performs quality assurance tasks by monitoring the progress and status of the carrier 10.

For example, the barcode scanner 42 of the apparatus 30 is configured to scan a barcode of each carrier placed in the clamp 117 of the plate adapter 116. This barcode uniquely identifies each carrier, with the barcode sent to the remote monitoring system during an assembly and testing process of the carrier 10. If, during the assembly and testing process, any flaws are detected, the relevant carrier is recorded as flawed by the remote monitoring system. In the event a flawed carrier is not quarantined and proceeds to a next step of the process, the remote monitoring system can prevent a controller or control system of a machine forming part of the process from performing any further work on the carrier.

Circuit detail of the barcode scanner 42 is shown in FIG. 10. The scanner 42 is switched on by a relay 272. The relay 272 is connected to the stepper motor controller 250. Thus, when a PCB (printed circuit board) of the scanner 42 is switched on, the relay 272 serves to actuate the stepper motor controller 250 so that the camera assembly 46 can begin an auto-focusing procedure.

This quality assurance functionality of the remote monitoring system prevents unnecessary work done on inferior quality carriers, as well as preventing the assembly of faulty printing components which could lead to malfunctioning final printing products, or the like.

Referring now to FIG. 7, the method commences with an operator removing a carrier with ICs thereon from a clean storage environment, such as a clean cabinet. This step is indicated by block 170. The operator then proceeds to scan the barcode of the carrier with the barcode scanner 42, indicated by block 172. This action serves to actuate the controller 250 so that the camera assembly 46 can begin the auto-focusing procedure.

As shown at block 174, the control system of the apparatus 30 relays the scanned barcode to the remote monitoring system. If there is a problem with the barcode, the remote monitoring system or the barcode scanner 42 can send a message to the touch panel PC 36 (or user interface—UI) to display a message to the operator, shown by block 176. The operator can then rescan the barcode, or discard the carrier as faulty.

If the remote monitoring system relays a message that the carrier 10 is suitable, the operator proceeds to load the carrier 10 into the clamp or test fixture 117, as at block 178. The carrier 10 is then moved into the sensing position by the support assembly 44, as described above, under operation of the servo motor 110. The controller or PC 36 controls movement of the support assembly 44 via the controller 250. The camera assembly 46 achieves the required Z-axis movement for focusing through operation of the servo motor 91 under control of the controller 250. The camera assembly 46 then enables the determination of the first and second carrier fiducials, shown at blocks 180 and 182, as well as the first and second IC fiducials of each IC, as shown at blocks 184 and 186.

The camera assembly 46 senses all the fiducials in this manner until the last fiducial has been sensed and its position on the carrier 10 stored by the controller. This process is indicated at block 188. Once all the fiducials have been sensed, the PC 36 is configured to generate data of the relative positions of the sensed fiducials to each other, as at block 190. This generated data is then displayed to the operator on the PC touch screen 36 (block 192) and uploaded to the remote monitoring system (block 194) as results of the sensing step.

If the results are unsatisfactory, the remote monitoring system is able to flag that respective carrier 10 as flawed. The method ends with the controller moving the carrier 10 from the sensing position to the loading position where the operator can remove the carrier 10 from the clamp or test fixture 117. This is indicated at block 196.

Figure 8:
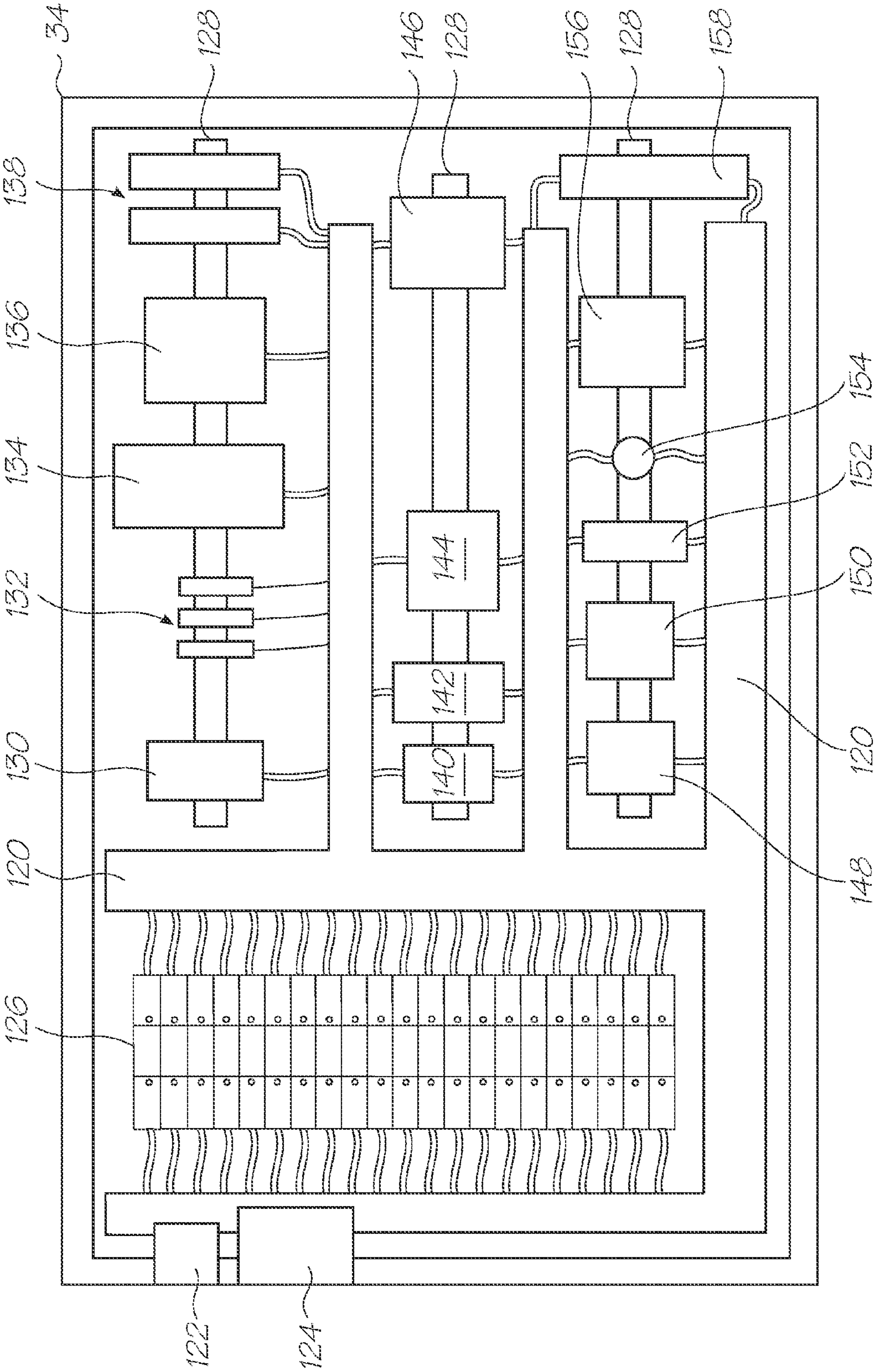
FIG. 8 shows a service panel layout of the apparatus shown in FIG. 3.

FIG. 8 shows the components of the control system concealed by the services panel 34 (see FIG. 3). The connector blocks 126 and the trunking 120 link to the PC touch screen 36 (see FIG. 3) to operate the control system. The Advantech PPC-123T touch screen display PC suitable as the PC touch screen 36. The trunking 120 is mounted in the support structure for connecting the relevant electrical and pneumatic wires and lines to the different components. The connecting blocks 126 facilitate the electrical connections between the components. The components are attached to mounting rails 128.

Mains isolation switch 122 forms the primary electrical connection of the apparatus to an external power source. The Sprecher & Schuh LE2-12-1782 2 pole switch cam unit is suitable for this application. The main pneumatic connection of the apparatus 30 is via pressure regulator 124. The Festo MPPES-3-1/4-2-010 series regulator has been found suitable for this task. A circuit breaker 130 (such as a Hager AC810T series circuit breaker) provides electrical protection for the electrical components, along with fuses 132.

Power supply 134 is a Phoenix Contact 12V 3A DC power supply and power supply 136 is a Phoenix contact 24V 2A DC power supply. The power supplies 134 and 136 supply the relevant components with electrical power. Optocouplers 138 (indicated with reference numerals 260, 262 in FIG. 10) are used to facilitate operation and interconnection between the clamp arrangement 274, the lights 264 and the servo motor 110, as described above. These units 138 are two pairs of NEC PS2502-2 series optocouplers.

A safety relay 140 in the form of an Omron G9S-2002 plug-in safety relay is connected to a servo motor controller 152 in order to switch off the servo motor 110. Safety door controller 142 is linked to magnetic door switches 50 (see FIG. 3) to stop the apparatus if the doors 48 (see FIG. 3) are opened. The controllers and switches from the Omron D40B series are suitable for these purposes. Safety contactors 144 are used to limit the motion of the support assembly 44. The safety contactors are two Sprecher & Schuh CAS7 series safety contactors. The LED light controller 146 is also mounted on the rail 128. Control panel 40 (see FIG. 3) also includes an emergency stop switch 290 (FIG. 13) for immediately stopping the apparatus 30.

The solenoid valves 148 and 150, such as SMC SY3160 series 5-port solenoid valves, control main air isolation and a pneumatic circuit of the clamp or test fixture 117 (see FIG. 6). The servo motor controller 152 such as a linear stage Motion Technologies CEL 6/200 driver is used to control operation of the stepper motor 110 (see FIG. 6).

Capacitor 154 is a 35V 2.2mF unit from Panasonic. Component 156 has an isolated convertor and analog output modules to convert the outputs from the PC touch screen (see FIG. 3) to control signals for the relevant components. An ADAM-4520 converter is suitable for the application. A Z-axis driver 158 in the form of a Zaber NA08A-16 stepper motor with a Copley STP-075-07 series driver, is responsible for camera focus of the camera assembly 46 via motor 91 (see FIG. 4).

Figure 9:
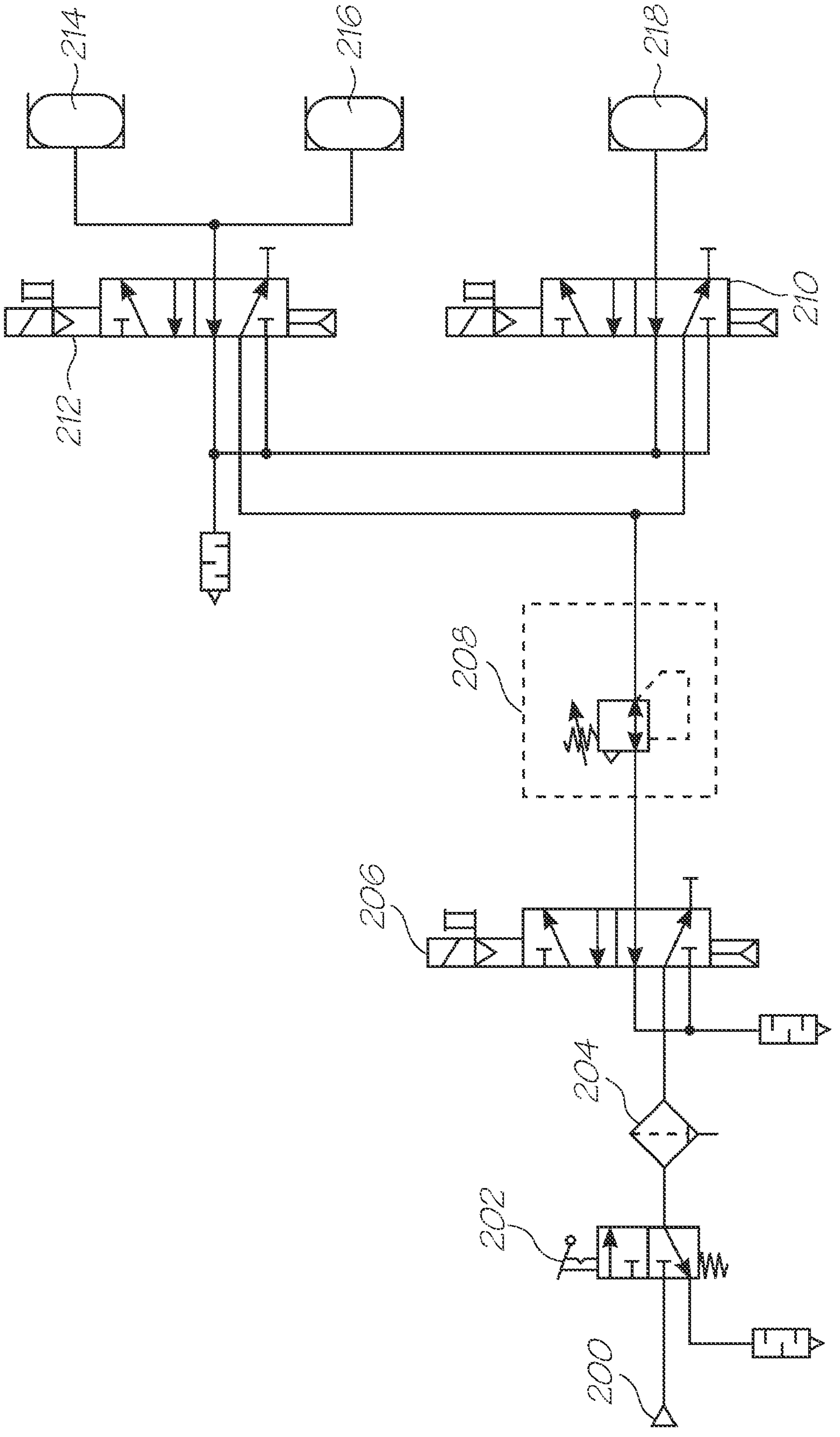
FIG. 9 shows a pneumatic diagram of pneumatic components of the apparatus shown in FIG. 3.

FIG. 9 shows a pneumatic diagram for pneumatic components of the apparatus 30. A main air supply 200 provides pressurised air to an isolation valve 202 in the form of an SMC VHS20-01 series manual isolation valve. This is in turn connected to mist separator 204, which is an SMC AFM20-01-C series unit. Solenoid valve 206 is a SMC SY3160-5MOZ-C6 series valve used to isolate the main system, and pressure regulator 208 regulates pressure to solenoid valves 210 and 212.

Solenoid valves 210 and 212 (indicated as 266 in FIG. 10) are both SMC SY3160-5MOZ-C6 series valves. In the shown configuration, valve 210 is not used, but valve 212 controls the clamp or test fixture 117 (see FIG. 6) for clamping the carrier 10 to the support assembly 44. The valve 212 actuates two parts of the clamp, namely clamp module 214 and 216. Clamping module 218 is connected to valve 210 and therefore not operative in this particular embodiment.

FIGS. 10 to 13 provide circuit diagrams showing the interconnections of the various electrical components. As will be appreciated by the skilled person, one component typically has a number of discrete wires comprising a single connection to another component. The circuit diagrams inherently show all the wires, but these can be collectively referred to as a single connection in the above description.

In FIG. 10, there is shown the barcode scanner 42 connected to the barcode scanner relay 272, in turn, connected to the stepper motor controller 250 (FIG. 11) and the servo motor controller 152. Thus, operation of the controllers 250, 152 can be linked to operation of the scanner 42.

The LEDs 264 and their operative connection to the optocouplers 260 is also shown in FIG. 10. Likewise, the solenoid valves 266 and their operative connection to the optocouplers 262 are shown. The optocouplers 260, 262 are connected to the controllers 152, 250.

FIG. 10 also shows the circuitry of the proximity switch 121. Circuitry of the lighting controller 146 is also shown. The pneumatic clamp arrangement 274 including the pressure regulator 278, the analogue output module 282 and the signal converter 280 is shown.

Figure 11:
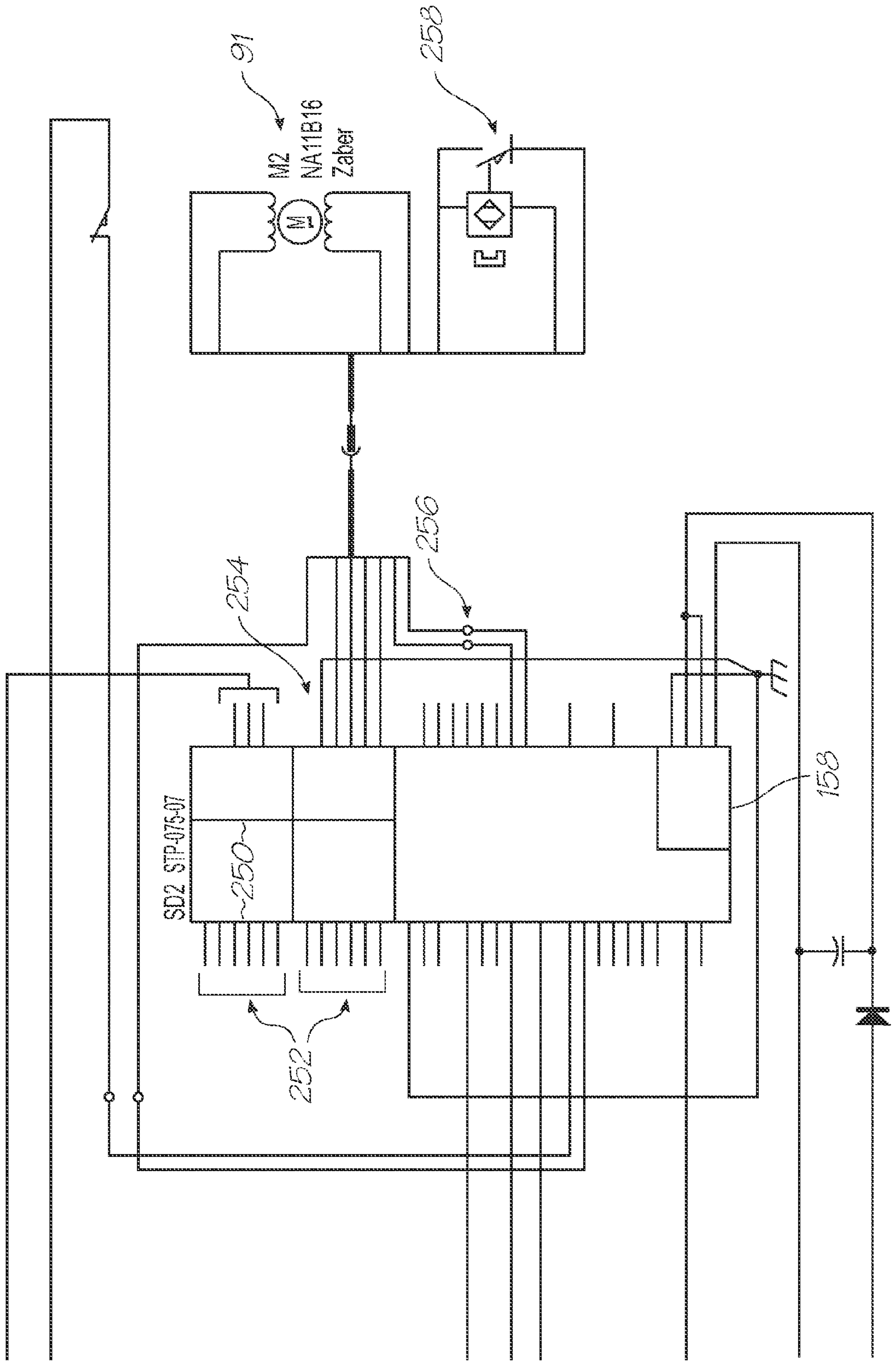
FIG. 11 shows a control diagram for a stepper motor of a camera assembly of the apparatus of FIG. 3.

FIG. 11 shows the circuitry relating to the stepper motor controller 250. As can be seen, there is an electrical connection between the linear stepper motor 91 and the Integral Hall limit switch 258.

Figure 12:
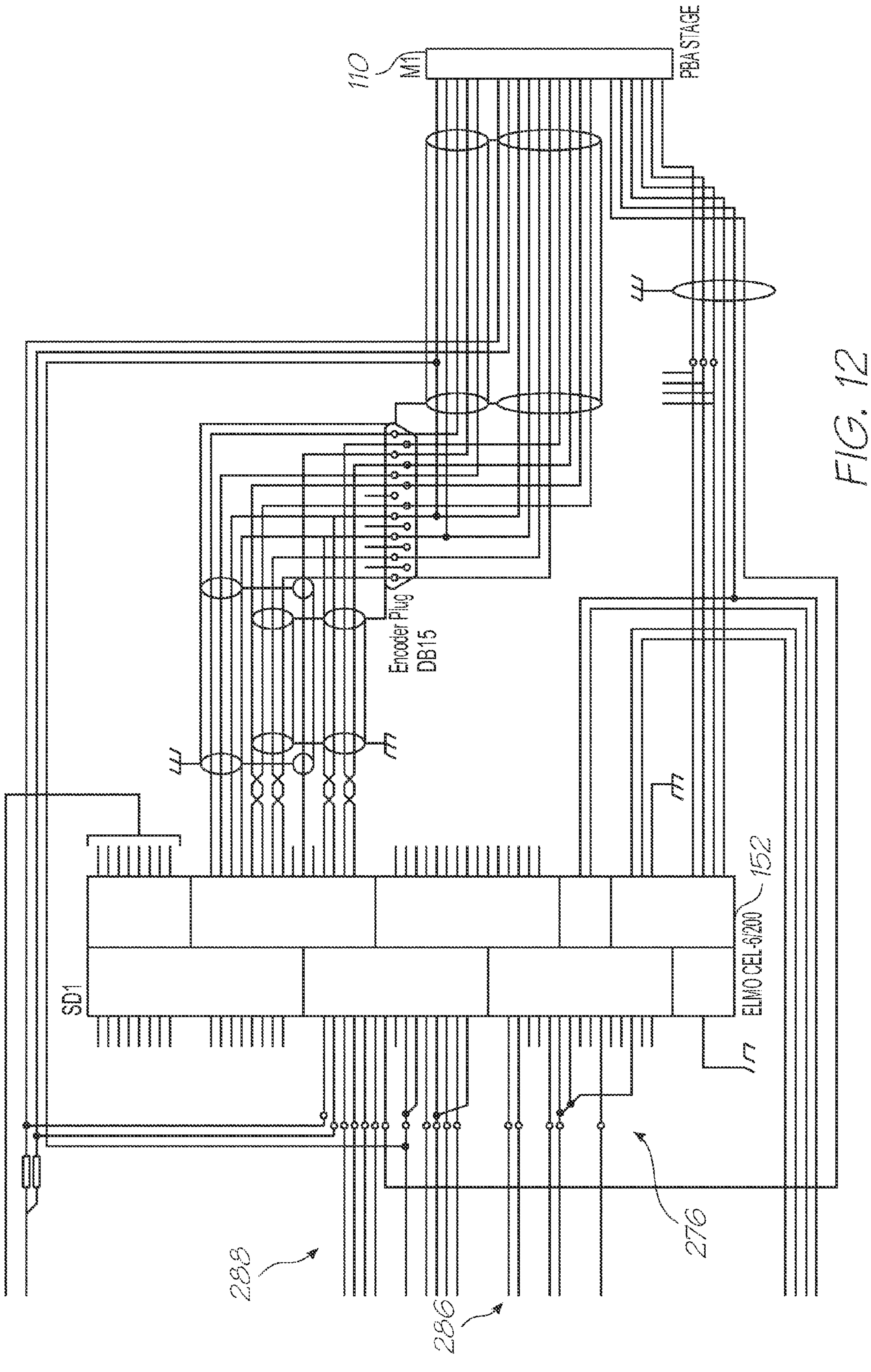
FIG. 12 shows a control diagram for a servo motor of a measuring table assembly of the apparatus of FIG. 3; and, FIG. 13 shows a control diagram for a safety system of the apparatus of FIG. 3.
Figure 13:
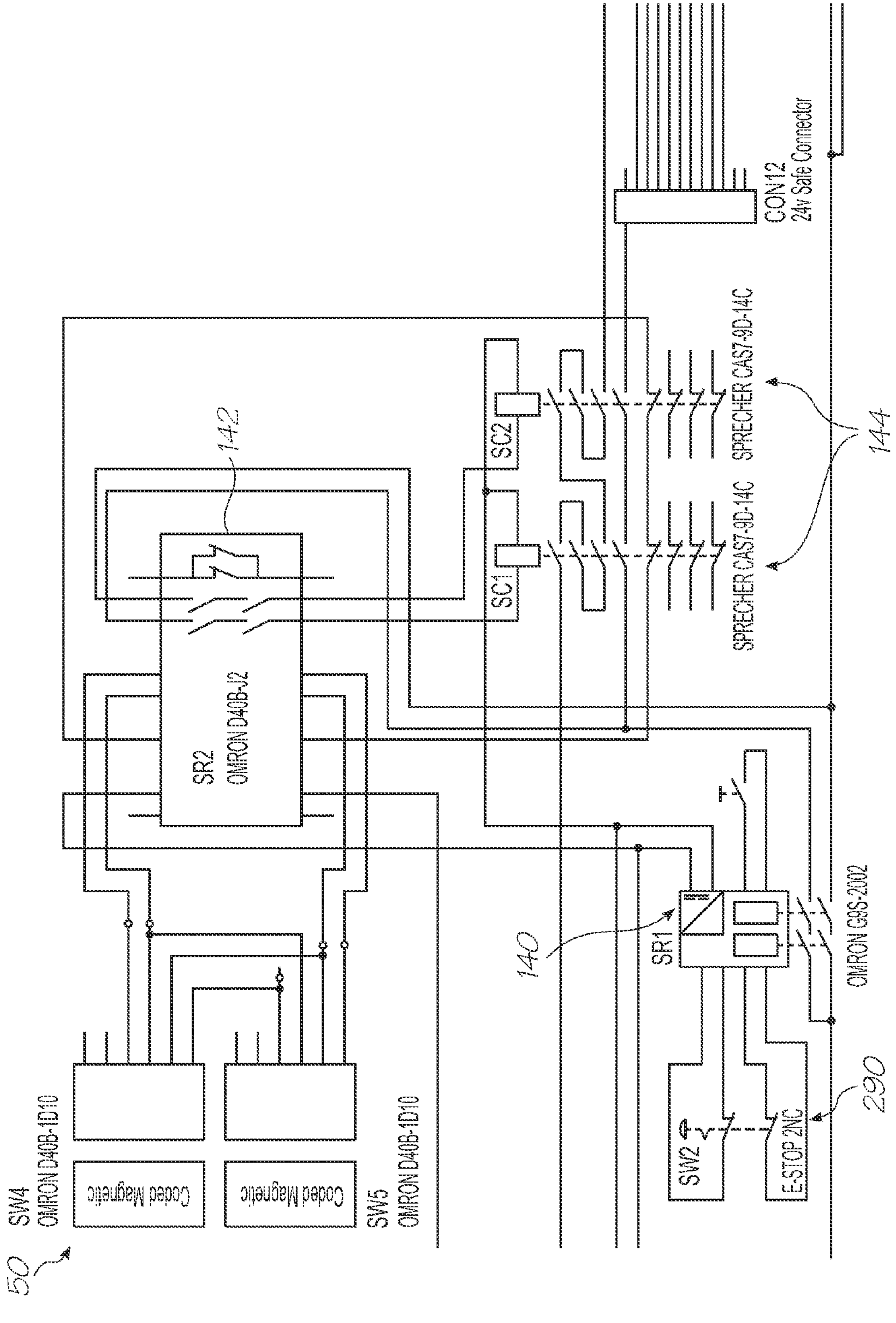

FIG. 12 shows the circuitry relating to the servo motor controller 152. The PC 36 is connected to the controller 152 via an RS 232 connection. As shown, the controller 152 is connected to the servo motor 110. At 288, the controller 152 is connected to the safety relay 140 (FIG. 13). At 286, the controller 152 is connected to the proximity switch 121. At 276, the controller 152 is connected to the pneumatic clamp arrangement 274.

FIG. 13 shows circuitry of a safety system, in accordance with the invention, of the measuring apparatus 30. The safety relay 140 is shown connected to the safety door controller 142 and the contacts 144. Operative connection of the magnetic door switches 50 is also shown.

The touch panel PC 36 controls operation of the servo motor controller 152 and thus the servo motor 110 to move the plate adapter 116 with the carrier 10 below the camera assembly 46. The controller 250 facilitates control of the linear stepper motor 91 to focus the optical assembly 94 on the carrier 10. The controller 36 can then examine the carrier with the camera assembly 46 to determine the relative positions of the respective fiducials and if they are properly aligned.

Similarly, controller 152 receives feedback from sensors such as the proximity switch 121 to determine the position of the carrier 10, and controls the pneumatic components, described in FIG. 9, to clamp the carrier to the plate adapter 116.

It is to be appreciated that the invention also extends to a software product for execution by the controller 36, as described above. The software product enables the controller 36 to perform the functions and relevant method steps described above. The invention inherently includes a computer readable memory, such as a magnetic or optical disc, incorporating such a software product.

The invention claimed is:

1. A measuring apparatus comprising:

a housing assembly that defines an enclosure;

a control system mounted in the housing assembly;

an operator interface mounted on the housing assembly and connected to the control system to allow an operator to control the measuring apparatus;

a measuring table assembly mounted in the housing assembly and configured to receive a nest assembly supporting an integrated circuit carrier carrying a number of integrated circuits; and a camera assembly mounted in the housing assembly and configured to generate image data representing the integrated circuit carrier and the integrated circuits, the camera assembly being connected to the control system which is configured to carry out a positional analysis on the integrated circuit carrier and the integrated circuits to determine at least one of positions of the integrated circuits on the carrier and relative positions of consecutive integrated circuits; wherein, the housing assembly includes a closure which can be opened or closed to allow or prevent access to the enclosure, the closure including a safety switch and the control system including a controller connected to the safety switch to stop operation of the measuring apparatus if the closure is opened during operation and the closure being configured to obstruct operator access to the operator interface when opened.

2. A measuring apparatus as claimed in claim 1, in which the measuring table assembly includes a linear stage assembly to displace the nest assembly linearly into an imaging position.

3. A measuring apparatus as claimed in claim 1, in which the camera assembly includes a camera post that is mounted on the measuring bed assembly to extend operatively above the measuring bed assembly.

4. A measuring apparatus as claimed in claim 3, in which the camera assembly includes a digital camera mounted on the camera post to be displaceable with respect to the camera post for focusing purposes, the digital camera being connected to the control system so that the control system can receive the image data generated by the digital camera.

5. A measuring apparatus as claimed in claim 4, in which the control system is configured to identify fiducials on the integrated circuit carrier and the integrated circuits and to calculate co-ordinate values with respect to a predetermined reference point corresponding to said fiducials.

6. A measuring apparatus as claimed in claim 5, in which the control system is configured to determine positions of the integrated circuits on the integrated circuit carrier and relative positions of the integrated circuits to assess alignment of the integrated circuits.

* * * * *